US010804841B2

(12) United States Patent
Weekley

(10) Patent No.: US 10,804,841 B2
(45) Date of Patent: Oct. 13, 2020

(54) SOLAR THERMAL ENERGY COLLECTOR

(76) Inventor: John C. Weekley, Bend, OR (US)

( * ) Notice: Subject to any disclaimer, the term of this patent is extended or adjusted under 35 U.S.C. 154(b) by 1960 days.

(21) Appl. No.: 13/216,144

(22) Filed: Aug. 23, 2011

(65) Prior Publication Data

US 2012/0145223 A1 Jun. 14, 2012

Related U.S. Application Data

(60) Provisional application No. 61/422,888, filed on Dec. 14, 2010.

(51) Int. Cl.
*H02S 40/44* (2014.01)
*F24S 10/50* (2018.01)

(52) U.S. Cl.
CPC ............ *H02S 40/44* (2014.12); *F24S 10/503* (2018.05); *Y02B 10/10* (2013.01); *Y02B 10/20* (2013.01); *Y02B 10/70* (2013.01); *Y02E 10/44* (2013.01); *Y02E 10/60* (2013.01)

(58) Field of Classification Search
CPC ......... H01L 31/058; H02S 40/44; F24J 2/202; F24J 2/204; F24J 2/04; F24J 2/0405; F24J 2/0422; F24J 2/0427; F24J 2/0433; F24J 2/0438; F24J 2/0444; F24J 2/045; F24J 2/0455
USPC .................................. 136/246, 248
See application file for complete search history.

(56) References Cited

U.S. PATENT DOCUMENTS

| | | | |
|---|---|---|---|
| 2,934,322 A | 4/1960 | Hazard | |
| 3,270,739 A | 9/1966 | Thomason | |
| 3,399,664 A | 9/1968 | Suhay | |
| 3,980,071 A | 9/1976 | Barber, Jr. | |
| 3,995,804 A | 12/1976 | Folds et al. | |
| 4,005,698 A | 2/1977 | Cuomo et al. | |
| 4,010,733 A * | 3/1977 | Moore | F24J 2/045 126/621 |
| 4,011,190 A | 3/1977 | Telkes | |
| 4,243,020 A * | 1/1981 | Mier | F24J 2/204 126/670 |
| 4,244,353 A * | 1/1981 | Straza | E04D 1/24 126/622 |
| 4,470,406 A * | 9/1984 | Rinklake | E04D 1/30 126/622 |
| 5,460,164 A * | 10/1995 | Rekstad et al. | 126/714 |
| 2005/0161074 A1 * | 7/2005 | Garvison | F24J 2/5228 136/246 |
| 2007/0235021 A1 | 10/2007 | Reed et al. | |

OTHER PUBLICATIONS

Alternative Energy Resources Solar Collector, designed by Peter Impex, Ltd.

* cited by examiner

*Primary Examiner* — Eli S Mekhlin

(74) *Attorney, Agent, or Firm* — The Noblitt Group, PLLC

(57) ABSTRACT

A solar thermal energy collection module formed by a sandwich of metal plates. The metal plates collect solar radiant energy and convert that to thermal energy in a heat transfer fluid that flows through conduits and manifolds formed between the plates. The collector module may be directly integrated into the exterior of building structures in an array. The collector module also may be glazed or integrated with photovoltaic solar panels.

10 Claims, 6 Drawing Sheets

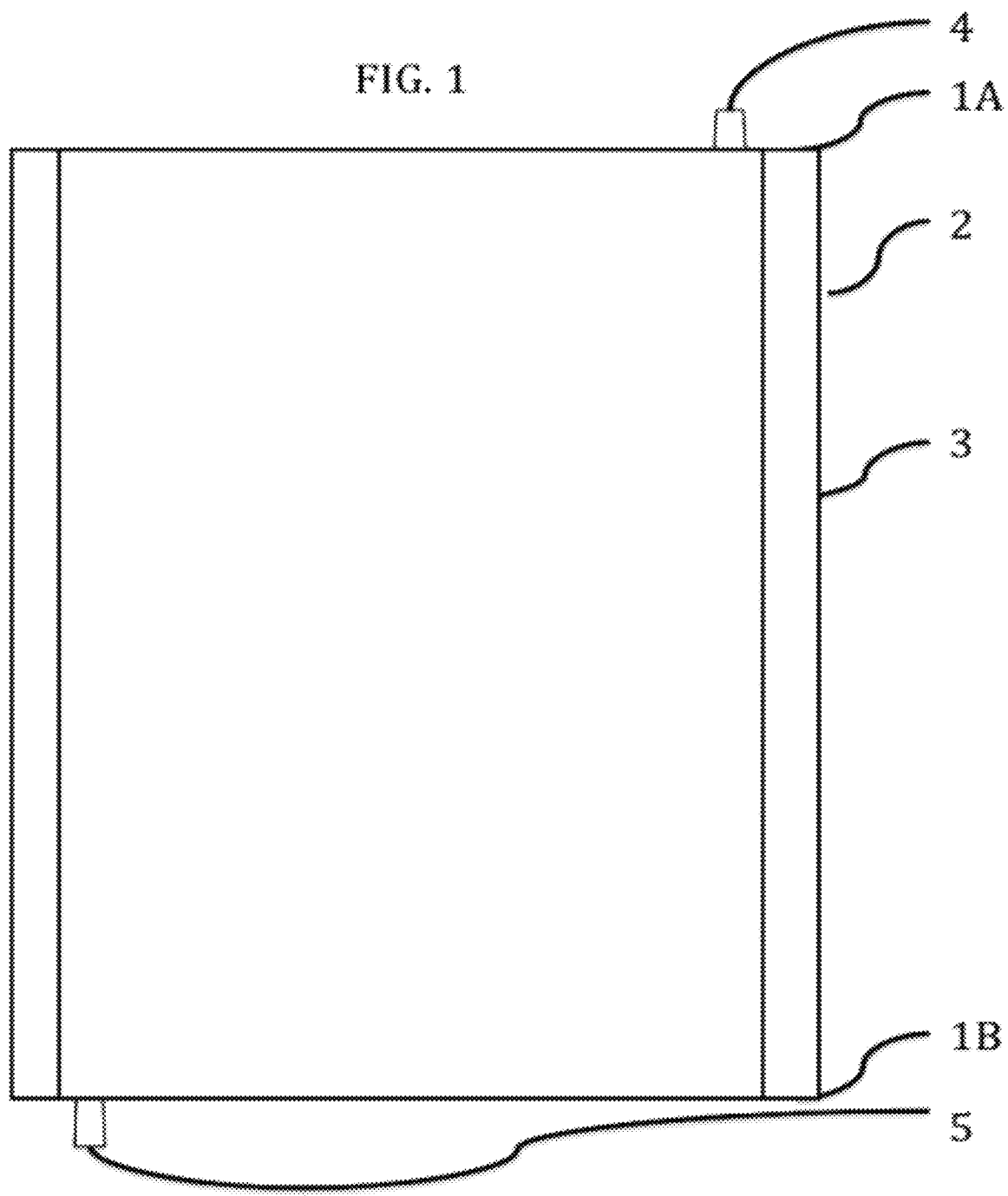

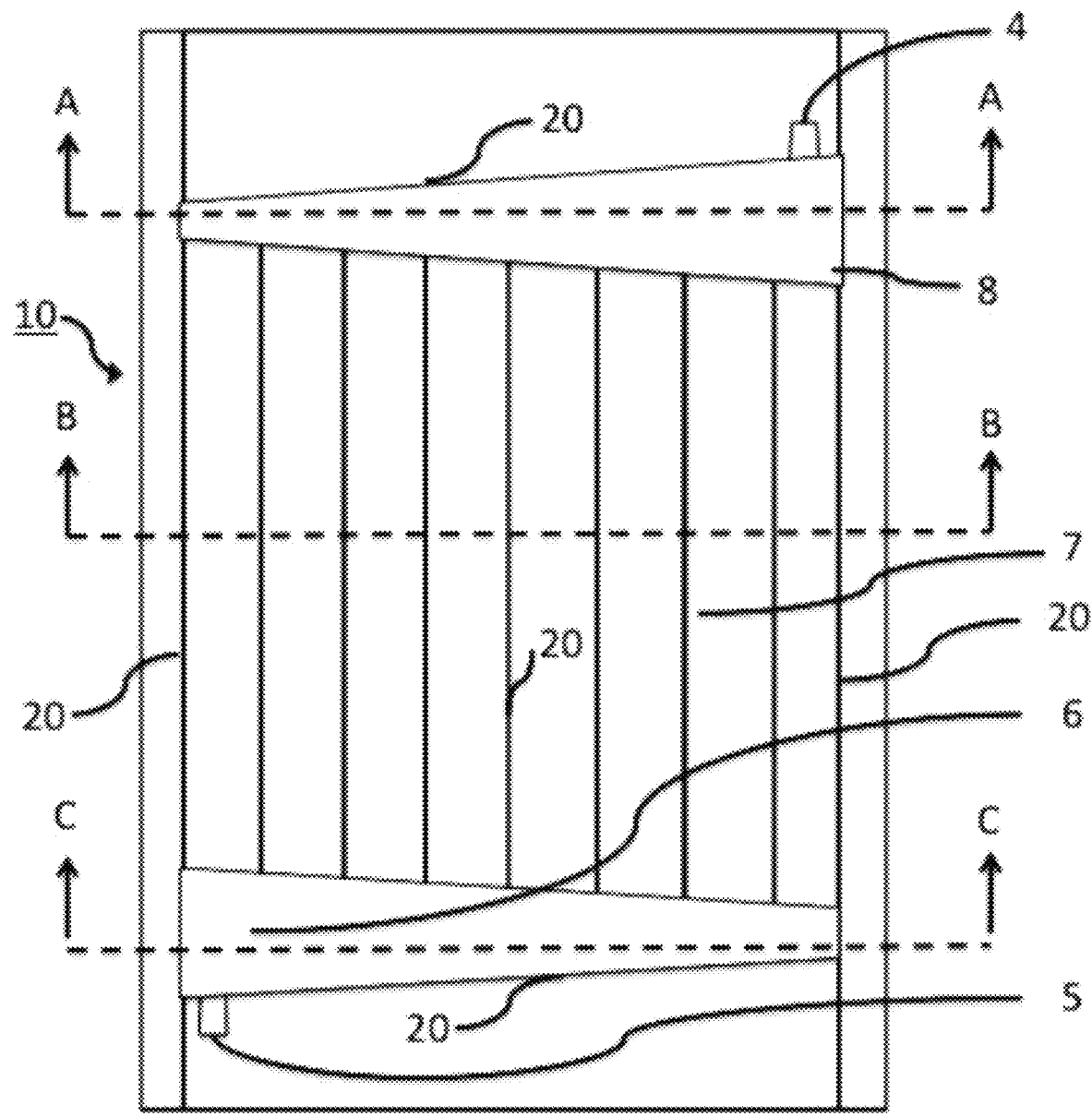

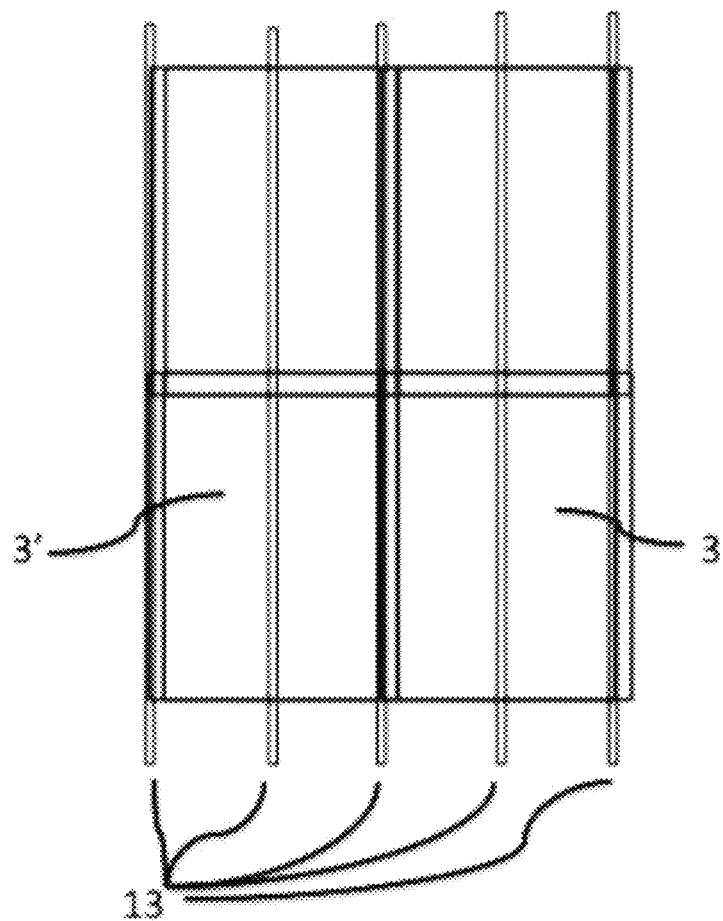
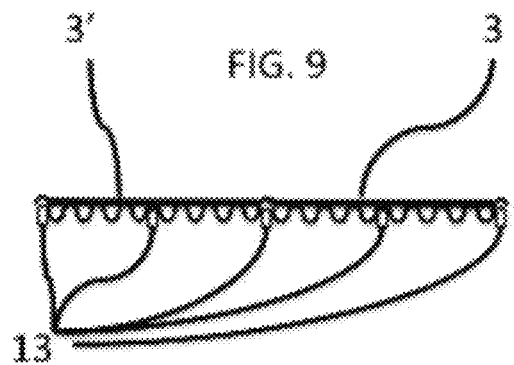

SOLAR THERMAL ENERGY COLLECTOR

CROSS-REFERENCE TO RELATED APPLICATION

This application claims benefit of priority under 35 U.S.C. 119(e) to U.S. Provisional Application No. 61/422,888 entitled "SOLAR THERMAL ENERGY COLLECTOR" and filed on Dec. 14, 2010, the entire contents of which are incorporated by reference.

BACKGROUND OF THE INVENTION

1. Field of the Invention

This invention relates to solar thermal energy collectors. Solar thermal energy collectors absorb solar irradiance and convert the light wave energy to heat energy. The heat energy is transferred to a fluid and then stored and used for heating residential and commercial applications. Some typical uses are heating swimming pools, heating domestic hot water, and heating buildings.

2. Discussion of the Related Art

Solar heating systems for generating hot water for commercial buildings, homes and swimming pools are well known and commercially available. A significant portion of a solar heating system is the solar thermal energy collector. Such collectors rely on a surface for absorbing the energy from the sun. The sun's energy is then transferred to a fluid, such as water, that is in thermal contact with the energy absorbing surface.

One such flat plate heat-exchanger; a solar application, utilizes an absorber plate that is welded to a second plate. The cavities within the space between the plates divide into many successive spaces, resulting in efficient heat transfer. Such heat exchanger does not have longitudinally extending parallel conduits. Moreover, such heat-exchanger is not adapted either for installation in the joists or studs of a building structure or for the addition of photovoltaic solar electricity generation.

All known solar thermal energy collectors suffer from relatively high cost due to a combination of high material costs and/or high manufacturing cost. Thus, the largest barrier to solar heating system adoption is the high first cost and the resulting poor economic payback.

SUMMARY OF THE INVENTION

The present invention reduces the first cost and improves the economic payback in four ways. 1) The design and construction of the invention uses lower cost materials, fewer materials, and less labor than any current solar energy collector, relative to the value of the energy collected. 2) The collector is designed for installation in new construction as an integral component of the structure, thus eliminating the cost of the construction materials and labor that would have otherwise been used. 3) The design and construction permit installation using less labor and installation materials than other solar thermal collectors. 4) The design allows the installation of solar photovoltaic panels on the top of the solar thermal collector, with the benefit of significantly improving the efficiency of the solar photovoltaic collector.

In accordance with one embodiment a collector module is constructed as a metal plate sandwich. on which the top plate has a selective surface that absorbs solar irradiance, and a bottom plate that is formed to contain and direct the flow of heat transfer fluid. The metal plates can be fabricated from galvanized steel, stainless steel or aluminum, for example. The resultant conduits and manifolds are an integral part of the joined top and bottom plate, thereby eliminating the need for separate pipes, tubes, or the like.

A feature of an embodiment of the invention is that the collector module design dimensions allow the solar thermal energy collector module to be installed directly between the joists and studs of a building structure, and may be arranged in an array of rows and columns on the building structure.

Another feature of an embodiment of the invention is that it is compatible with thermal heat system designs using any of the common methods, including closed loop, open loop, drain-down and drain-back.

Another feature of an embodiment of the invention is that it is adapted to the mounting of solar photovoltaic collectors above the top plate of the collector modules, potentially improving the performance of both the thermal collector and the photovoltaic collector.

The foregoing features of the present invention will be discussed in detail in the following non-limiting description in connection with the accompanying drawings.

BRIEF DESCRIPTION OF THE DRAWINGS

FIG. 1 is a front elevation view of the top plate of the multi-layer sandwich structure solar thermal collector module.

FIG. 2 is a backside elevation of the bottom plate of the multi-layer sandwich structure solar thermal collector module.

FIG. 8 shows the solar thermal collector module with an array of 2 by 2 collector modules installed in an array of columns and rows.

FIG. 9 is a cross-sectional view of the module installation illustrated in FIG. 8.

DETAILED DESCRIPTION

Figure 3A:
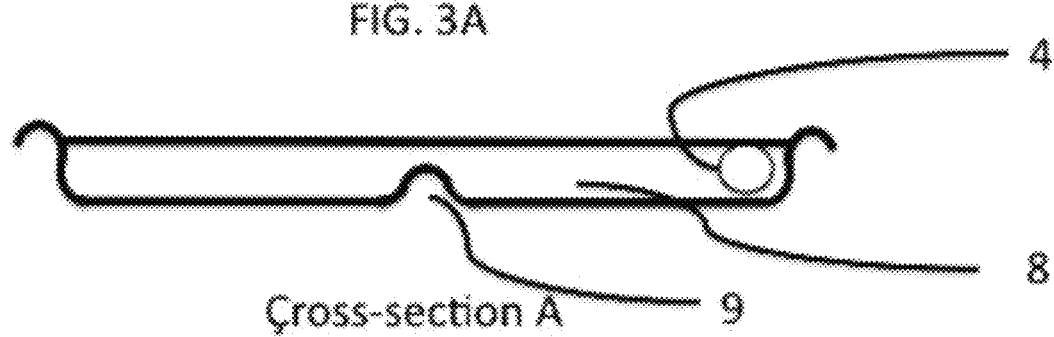
FIGS. 3A, 3B and 3C are horizontal cross sections of the module shown in FIG. 2.

Refer now to FIG. 1, which is a front elevation view schematically illustrating the solar thermal collector module. The surface of the first metallic plate of the multi-layer sandwich structure thermal collector module 3 can be coated with black paint, or preferably, a selective surface that increases the solar thermal absorption, while minimizing the energy losses to emission and convection. The top 1A and the bottom 1B edges are formed to permit the module to be easily installed in an array and column pattern on the roof or wall of a building structure, and provide for a weather flashing and seal. The sides 2 of the solar thermal collector may either be formed to be interlocking, or may be formed to facilitate the mechanical attachment of photovoltaic solar collectors above the solar thermal energy collector. The heat transfer fluid connections 4 and 5 would normally not be visible in this view and are shown merely to provide a schematic illustration in FIG. 1. Refer now to FIG. 2 showing the backside elevation (lower plate 10) of the solar thermal energy collector module. This backside is a second metallic plate 10 that is joined to the first metallic plate 3, typically by welding to form a multi-layer sandwich structure. The preferred welding areas are shown at 20. The heat transfer fluid connections 4 and 5 provide for heat transfer fluid entry and exit. Inlet manifold 6 receives the cooler heat transfer fluid when the solar thermal energy collector is oriented with the fluid input connection 5 on the lower portion of the collector. The heat transfer fluid flows in channels 7, and exits the solar thermal energy collector module at outlet manifold 8 and output connection 4. In this orientation, the heat transfer fluid enters at 5, is distributed in manifold 6 to flow upward in channels 7 where it gains thermal heat energy, collects in manifold 8, and flows out in connection 4. The collector can also function in other orientations. Thus the thermal collector is a sandwich structure formed by upper plate 3 and lower plate 10. The two plates are joined together, for example by welding. Weld seam locations 20 are illustrated by heavier lines in FIG. 2.

Figure 3B:
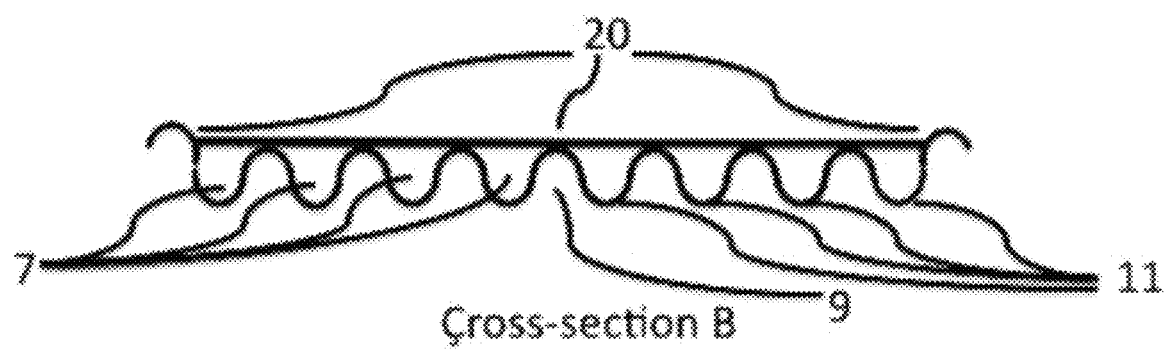
Figure 3C:
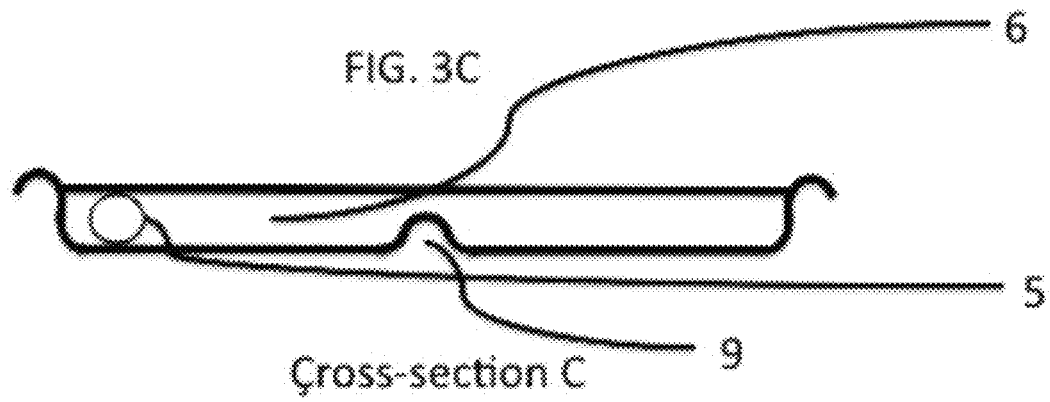

FIGS. 3A, 3B and 3C show the positions of horizontal cross sections of the view in FIG. 2. Corresponding elements have been shown with the same reference numerals. Slots 9 are provided for convenient installation on the roof or in the wall of a building as will be later described with reference to FIGS. 8 and 9.

FIGS. 1, 2 and 3A to 3C as well as FIGS. 4, 5, 6, and 7 schematically illustrate the use of two metal plates, where the first metallic top plate 3 is planar and is exposed to solar irradiance. The second metallic plate, lower plate 10' is formed by stamping, bending and/or other mechanical operations adapted to form manifolds 6 and 8 and channels 7 for directing the flow of the heat transfer fluid. The two plates are permanently bonded by welding, brazing, and similar procedures to complete the structure. Joining of the two plates can be at seam areas 20 as illustrated in FIG. 3B. With the first and second metallic plates joined together, irregularities such as longitudinally extending protrusions 11 form elongated parallel conduits 7 and manifolds 6 and 8. For the sake of clarity, not every protrusion 11 and conduit 7 is identified by these reference numerals. Also, although corresponding reference numerals have been used in the various drawings, obviously identical items have not always been labeled with reference numerals. For example, In FIGS. 4, 5, 6, and 7, the protrusions 11 and conduits 7 are not specifically identified with these reference numerals.

Figure 4:
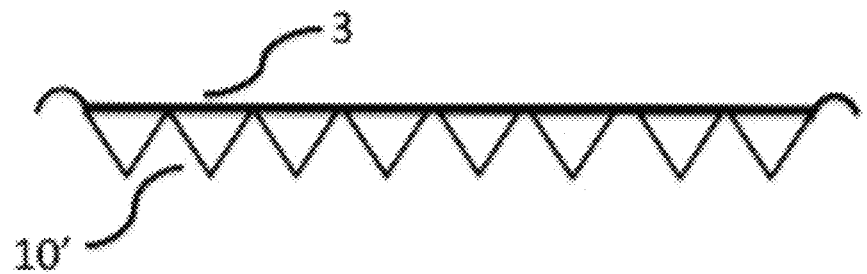
FIG. 4 is a schematic representation of another embodiment of a horizontal cress-section of the module illustrated in FIG. 3B.
Figure 5:
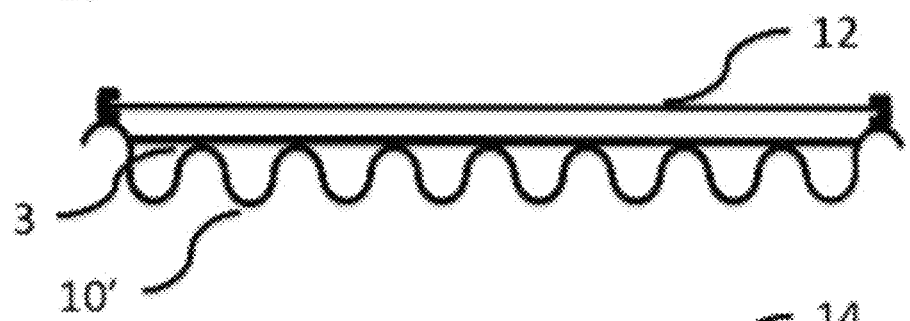
FIG. 5 schematically illustrates a glazing plate mechanically secured above the module illustrated in FIG. 3B.

The cross-section of the channel (conduit) through which the heat transfer fluid is pumped can be any convenient shape. For example, see the cross-section shown in FIG. 4 illustrating a shape easily obtained by known methods such as corrugation. These corrugated channel (conduit) shapes as well as others can then be covered by a glazing plate as illustrated in FIG. 5. Such a glazing plate 12 holds heat in. Thus, in cold weather it provides insulation from the outside air while permitting the sun's heating rays through to heat the first plate and then heat transfer fluid.

Figure 6:
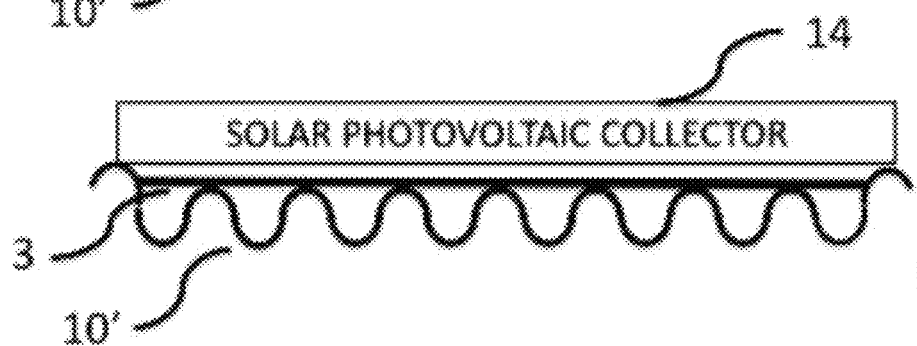
FIG. 6 schematically illustrates a solar photovoltaic collector panel mechanically attached to the module illustrated in FIG. 3B.
Figure 7:
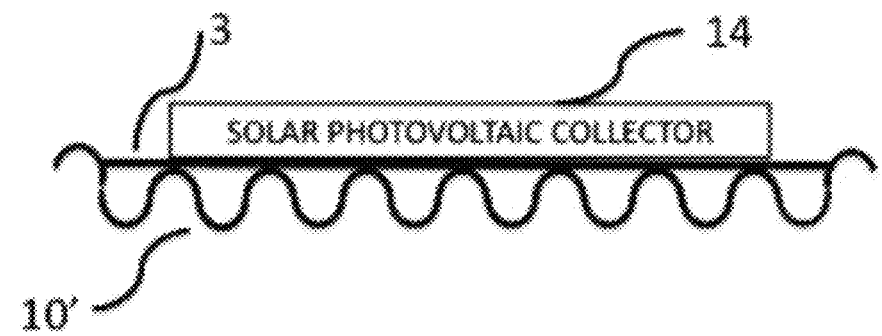
FIG. 7 schematically illustrates a solar photovoltaic collector panel adhesively attached to the module illustrated in FIG. 3B.

Refer now to FIG. 6 which schematically illustrates another embodiment. A solar photovoltaic collector 14 is shown mechanically attached above a solar thermal collector module (i.e. the sandwich structure formed by upper panel 3 and lower panel 10'. Such a solar panel can provide the insulation function of previously described glazing plate 12. More significantly, there is substantial coaction between solar photovoltaic collector 14 and the thermal collector module. As is well known, solar photovoltaic collectors become very hot while generating electricity. This heat, transferred to the thermal collector module, heats the fluid being pumped through the thermal collector. Significantly, the cooler fluid entering the thermal collector module cools the photovoltaic collector 14. As is well known, as the temperature of the solar photovoltaic collector increases, its efficiency (the amount of electricity produced) decreases. Thus, simultaneously as heat is transferred from the photovoltaic collector to the thermal collector, the photovoltaic collector is cooled, thereby increasing its efficiency. In this regard, see FIG. 7 schematically illustrating solar photovoltaic collector 14 adjacently joined to the thermal collector module, for example with an adhesive that is also heat conducting. This adjacent joining can further enhance the synergistic relationship between the thermal and photovoltaic collectors. As the photovoltaic collector generates more electricity as a result of the cooling provided by the thermal collector, the thermal collector receives significant heating from the photovoltaic collector as well as protection from cold weather conditions, the photovoltaic collector thereby providing the previously described benefit of a glazing plate.

As a significant feature of another embodiment, the solar thermal collector module may be installed in an array of columns and rows as shown in FIG. 8, where an array of 2 by 2 collectors is shown. The selective surfaces 3 and 3' of the modules are fastened to the joists 13 of a roof as shown, or the studs of a wall. In the case of vertical wall mounting, joists 13 will be studs. In case metallic building materials are used, the joist and or studs can be referred to as purlins. The exterior edges of each module are installed and attached to the adjacent building materials using standard flashing methods. The interior side edges are mechanically joined to the adjacent module inside the array. The heat transfer fluid plumbing connections to each module are completed inside the roof or wall structure. Dimensionally, if the joist 13 or studs are on 24 inch centers then the thermal collection modules would be typically 50 inches wide. FIG. 9 schematically illustrates the positioning of joists 13 in slots in thermal collector module 3. Here two modules (3 and 3') are shown mounted adjacently, these being two of the illustrated 2×2 array.

Thus, FIGS. 8 and 9 shows two instances of the "B" cross-section view in FIG. 3B, where two modules are installed adjacently. The interior side of the thermal collector module may be insulated inside the structure using standard building insulation practices and materials, to reduce conductive and convective heat loss. The solar thermal collector may also be installed on the exterior surface of the roof or wall on an existing building by installing a frame of wood or metal purlins to support the collector(s).

An array of solar photovoltaic (PV) panels (not shown in FIGS. 8 and 9) may be installed on the top surface of the solar thermal module array by using mechanical attachment to the left and right side of the thermal module, which are mechanically attached using a mechanical connection that is compatible with standard PV mounting hardware connectors. The efficiency of any PV panel is significantly degraded when the PV panel heat increases. By attaching the PV module on top of an unglazed solar thermal module, the performance of both systems will increase. The PV module will reduce the convective and radiant losses from the unglazed solar thermal panels. The solar thermal modules will increase the performance of the PV modules by extracting heat from the backside of the PV module and transferring it away from the PV panel to thermal use or storage. For typical PV panels, each degree rise above 25° C., electrical output drops by up to half a percent. A typical rooftop PV array may expect to produce 5% to 10% more power during peak irradiance when installed above the thermal panel as described.

Figure 10:
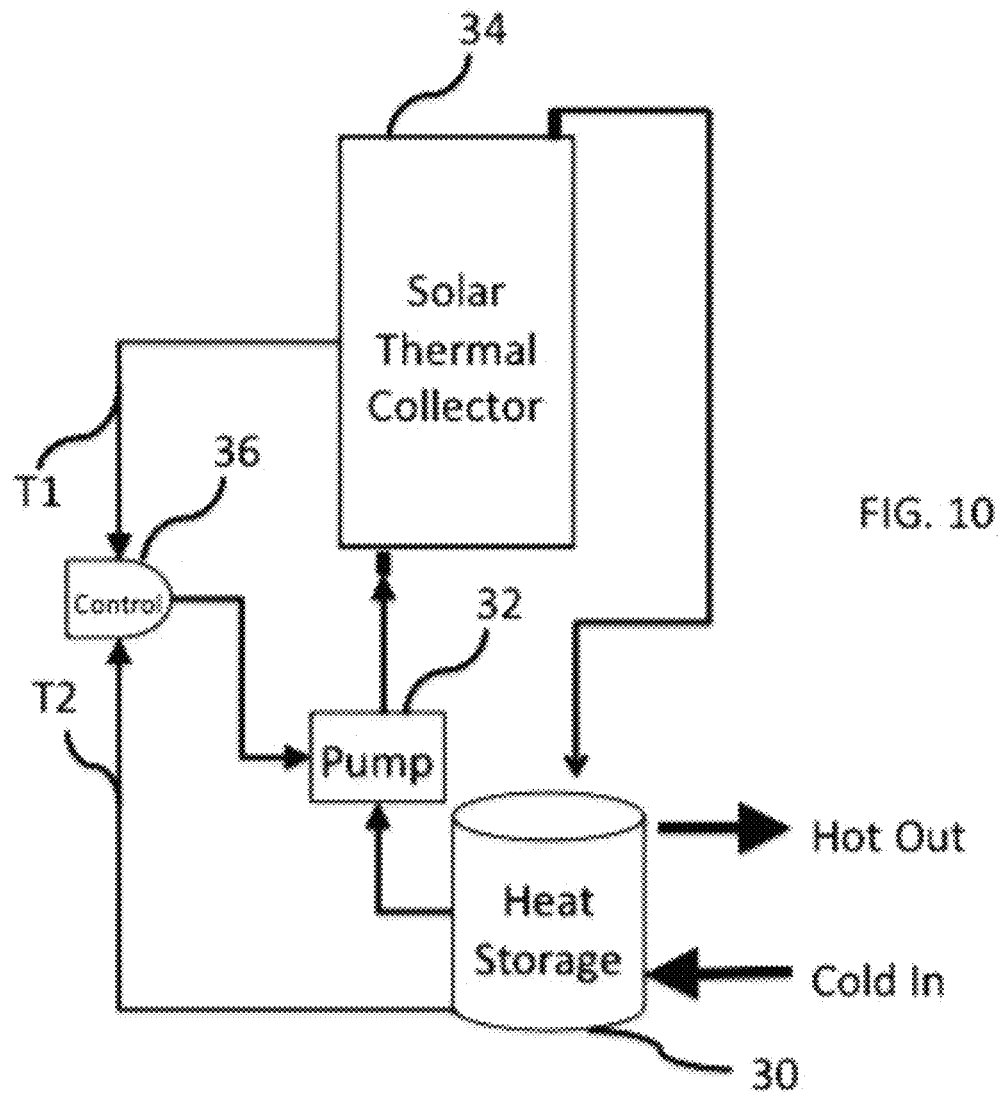
FIG. 10 shows a simplified schematic example of the solar collector connection to a solar thermal system.

FIG. 10 shows a simplified example of the solar collector connection to a solar thermal system. Heat transfer fluid in the heat storage is pumped through the solar thermal collector using control processor and heat sensors to manage the systems. Solar energy heats the transfer fluid, and it returns to the heat storage container. The stored heat is then available for residential and commercial applications, such as heating domestic hot water, heating swimming pools, and heating buildings. As specifically shown in FIG. 10, fluid enters and exits heat storage unit 30. Fluid circulation is provided by pump 32 as the fluid is pumped through solar thermal collector 34. The operation of pump 32 is controlled by control device 36. The control device receives the temperature in collector 34 via line T1 and the temperature from the heat storage container 30 on line T2. Control device 36 can be adjusted to sense the difference in the temperatures T1 and T2 to activate the operation and speed of pump 32.

The invention is compatible with thermal heat system designs using any of the common methods, including closed loop, open loop, drain-down and drain-back:

While preferred embodiments of the invention have been set forth for purposes of disclosure, alterations, modifications and improvements to the disclosed embodiments are intended to be within the spirit and scope of the invention. Accordingly, the foregoing description is by way of example only and is not intended to be limiting. The present invention is limited only as defined in the following claims and the equivalents thereof.

What is claimed is:

1. A multi-layer sandwich structure for heating a liquid by solar power, comprising:
    a first metallic plate having a planar surface area defined by opposing first and second side edge portions extending between opposing first and second end portions;
    a second metallic plate joined to a downward facing first side of the planar surface of the first metallic plate, wherein the second metallic plate comprises:
        a pair of side edges extending between a top edge and a bottom edge;
        a plurality of protrusions distributed along a center portion of the second metallic plate and oriented substantially parallel to the pair of side edges, wherein:
            a portion of the second metallic plate between each protrusion is in contact with the planar surface of the first metallic plate; and
            a channel is formed between each protrusion and portion of the second metallic plate contacting the planar surface of the first metallic plate;
        a first manifold area disposed between the pair of side edges, the top edge, and a first end of the plurality of protrusions; and
        a second manifold area disposed between the pair of side edges, the bottom edge, and a second end of the plurality protrusions; and
    a first and a second receiving section, wherein:
        the first receiving section is positioned along the first side edge portion of the first metallic plate between the opposing first and second end portions of the first metallic plate and extends outwardly away from the first side edge portion;
        the second receiving section is positioned opposite the first receiving section along the second side edge portion between the opposing first and second end portions of the first metallic plate and extends outwardly away from the second side edge portion;
        each receiving section includes a downward facing receiving surface relative to the planar surface of the first metallic plate; and
    wherein:
        the receiving surface of the first receiving section is configured to partially wrap around at least one exterior surface of at least one of a first wall stud, a first roof rafter, and a first purlin; and
        the receiving surface of the second receiving section is configured to partially wrap around at least one exterior surface of at least one of a second wall stud, a second roof rafter, and a second purlin.

2. A multi-layer sandwich structure for heating a liquid by solar power according to claim 1, wherein the first receiving section is separated from the second receiving section by a distance of about forty-eight inches.

3. A multi-layer sandwich structure for heating a liquid by solar power according to claim 1, further comprising a slot disposed between two protrusions and extending between the top edge and the bottom edge of the second metallic plate, wherein the slot is configured to receive at least one of a third wall stud, a third roof rafter, and a third purlin oriented parallel to the pair of side edges when the first and second receiving sections are partially wrapped around the at least one the first and second wall stud, the first and second roof rafter, and the first and second purlin.

4. A multi-layer sandwich structure for heating a liquid by solar power according to claim 3, wherein the first receiving section is separated from the slot by a distance of about twenty-four inches.

5. A multi-layer sandwich structure for heating a liquid by solar power according to claim 1, wherein the planar surface of the first metallic plate is joined to the second metallic plate by a plurality of bonded seams to seal the first and second manifold areas and the channel formed between each protrusion of the second metallic plate.

6. A multi-layer sandwich structure for heating a liquid by solar power according to claim 1, wherein the planar surface of the first metallic plate comprises a selective surface.

7. A multi-layer sandwich structure for heating a liquid by solar power according to claim 1, further comprising a photovoltaic solar collector joined to an upward facing second side of the planar surface of the first metallic plate.

8. A multi-layer sandwich structure for heating a liquid by solar power according to claim 1, wherein the channel formed between each protrusion of the second metallic plate comprises a triangular cross-sectional shape.

9. A multi-layer sandwich structure for heating a liquid by solar power according to claim 1, wherein the channel formed between each protrusion of the second metallic plate comprises a boxed cross-sectional shape.

10. A multi-layer sandwich structure for heating a liquid by solar power according to claim 1, wherein the channel formed between each protrusion of the second metallic plate comprises a U shaped cross-section.

* * * * *